(12) United States Patent
Kitagawa

(10) Patent No.: US 10,486,706 B2
(45) Date of Patent: Nov. 26, 2019

(54) DRIVING FORCE CONTROL SYSTEM FOR VEHICLE

(71) Applicant: Toyota Jidosha Kabushiki Kaisha, Toyota-shi (JP)

(72) Inventor: Hiroyasu Kitagawa, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 51 days.

(21) Appl. No.: 15/955,068

(22) Filed: Apr. 17, 2018

(65) Prior Publication Data

US 2018/0297600 A1 Oct. 18, 2018

(30) Foreign Application Priority Data

Apr. 18, 2017 (JP) .................. 2017-082319

(51) Int. Cl.
*B60W 10/06* (2006.01)
*B60W 10/10* (2012.01)
*B60W 30/19* (2012.01)
*F02D 41/00* (2006.01)
*F02D 41/02* (2006.01)
*F02D 41/04* (2006.01)
(Continued)

(52) U.S. Cl.
CPC ............ *B60W 30/19* (2013.01); *B60W 10/06* (2013.01); *B60W 10/10* (2013.01); *B60W 10/11* (2013.01); *F02D 41/0007* (2013.01); *F02D 41/0225* (2013.01); *F02D 41/045* (2013.01); *F02D 41/10* (2013.01); *B60W 2520/10* (2013.01); *B60W 2540/10* (2013.01); *B60W 2540/106* (2013.01); *B60W 2710/1005* (2013.01); *B60W 2720/106* (2013.01); *F02D 2200/1002* (2013.01); *F02D 2200/501* (2013.01); *F02D 2200/602* (2013.01)

(58) Field of Classification Search
CPC ...... B60W 10/06; B60W 10/10; B60W 10/11; B60W 30/19; B60W 2540/10; B60W 2540/103; B60W 2540/106; F02D 41/10; F02D 2200/602
See application file for complete search history.

(56) References Cited

U.S. PATENT DOCUMENTS

| 6,038,504 | A | 3/2000 | Cronin et al. |
| 2009/0043428 | A1 | 2/2009 | Matsunaga et al. |

(Continued)

FOREIGN PATENT DOCUMENTS

| JP | 11-311314 | 11/1999 |
| JP | 2007-15432 | 1/2007 |

(Continued)

*Primary Examiner* — Edwin A Young
(74) *Attorney, Agent, or Firm* — Oblon, McClelland, Maier & Neustadt, L.L.P.

(57) ABSTRACT

A driving force control system for a vehicle configured to control a driving force based on the accelerating operation by the driver. The vehicle comprises a drive unit including a prime mover and a transmission, an accelerator device; and a controller. The controller is configured to: calculate an operating amount of the accelerator device; calculate an operating speed of the accelerator device; calculate a target jerk; and control an output torque of the drive unit based on the target jerk, when the operating amount is smaller than a predetermined amount, and the operating speed is slower than a predetermined speed.

7 Claims, 8 Drawing Sheets

(51) Int. Cl.
*F02D 41/10* (2006.01)
*B60W 10/11* (2012.01)

(56) References Cited

U.S. PATENT DOCUMENTS

| | | |
|---|---|---|
| 2010/0197457 A1 | 8/2010 | Kuwahara et al. |
| 2012/0101678 A1* | 4/2012 | Oyama ............... B60W 10/101 701/22 |
| 2012/0296541 A1* | 11/2012 | Matsushita ........... B60W 10/06 701/70 |
| 2014/0088789 A1 | 3/2014 | Jeon |
| 2017/0043677 A1* | 2/2017 | Ko ......................... B60L 15/20 |

FOREIGN PATENT DOCUMENTS

| | | |
|---|---|---|
| JP | 2007-196764 | 8/2007 |
| JP | 2007-270704 A | 10/2007 |
| JP | 2009-121238 | 6/2009 |
| JP | 2014-66692 | 4/2014 |
| JP | 2016-94883 A | 5/2016 |
| JP | 2016-205454 | 12/2016 |
| JP | 2017-48916 A | 3/2017 |

\* cited by examiner

DRIVING FORCE CONTROL SYSTEM FOR VEHICLE

CROSS REFERENCE TO RELATED APPLICATION

The present application claims the benefit of Japanese Patent Application No. 2017-082319 filed on Apr. 18, 2017 with the Japanese Patent Office.

BACKGROUND

Field of the Disclosure

Embodiments of the present disclosure relate to a system for controlling a driving force of a vehicle according to an acceleration demand from a driver.

Discussion of the Related Art

JP-A-2009-121238 discloses a driving force control system for a vehicle including an engine and a geared automatic transmission. The driving force control system is configured to control a torque of the engine according to the position of the accelerator pedal during a normal operation. A gear stage of the automatic transmission is switched on the basis of the position of the accelerator pedal and a vehicle speed. Thus, the control on the torque of the engine performed while the vehicle is downshifted results in the driving force changing stepwise. In this context, the driving force can be smoothly changed according to the teachings of JP-A-2009-121238. Specifically, the torque of the engine is set to be larger than a torque based on an accelerator operating amount before the downshifting starts, and is set to be smaller than the torque based on the accelerator operating amount after the downshifting starts.

JP-A-2016-205454 discloses a shift control system configured to restore a shift range from the neutral range to the drive range, when a shift lever is accidentally operated from the drive position to the neutral position while the vehicle is parked. The shift range may be switched to the drive range after the accelerator pedal has been depressed by a certain amount. A torque output according to the position of the accelerator pedal at this point might result in sudden start. In order to prevent such sudden start, the control system is configured to gradually increase the torque for the vehicle starting when the shift lever is accidentally operated. The shift lever is determined to have been accidentally operated when the brake pedal returns and the accelerator pedal is depressed after the shift range is switched from the drive range to the neutral range. The shift range might be switched to the drive range as described above with the depressing speed of the accelerator pedal exceeding a predetermined value. This means that the sudden start is intended by the driver. In such a case, the torque for the vehicle starting is increased at a higher rate than in the case where the depressing speed of the accelerator pedal is smaller than the predetermined value.

JP-A-2007-15432 and JP-A-2014-66692 disclose a device and a method for evaluating the acceleration feeling sensed by the driver. The device disclosed in JP-A-2007-15432 calculates a vehicle front/rear acceleration on the basis of the position of the accelerator pedal, the gear stage, vehicle weight, vehicle speed, the road inclination, and the like. Then, the acceleration expected by the driver is calculated on the basis of the front/rear acceleration, and a jerk is calculated by differentiating the acceleration. Furthermore, the acceleration and the jerk sensed by the driver are calculated on the basis of a load acting on a seat cushion, a load acting on a backrest, and the like. The acceleration feeling is evaluated on the basis of a difference between the acceleration/jerk expected by the driver and the acceleration/jerk sensed by the driver. JP-A-2014-66692 discloses a method for evaluating acceleration feeling. The evaluation is based on factors including: an acceleration rising slope in a period from a time point where the acceleration (or an increasing rate) is increased to a predetermined rate after a tip-in time point to a time point where the acceleration arrives the maximum acceleration; the first effective peak jerk after tip-in of the driver; and an effective peak jerk after arriving the maximum acceleration.

JP-A-2007-196764 discloses idling stop/start control for a vehicle including: an engine and a motor serving as a prime mover; a clutch that can block transmission of torque between the engine and the motor; and a transmission provided between the motor and drive wheels. The idling stop/start control is based on the following configuration. Specifically, the clutch is disengaged so that the vehicle travels with the motor when a speed of an operation on the accelerator pedal is equal to or larger than a predetermined value. When a predetermined condition is satisfied, the clutch is engaged so that the engine is cranked by the motor and the transmission is shifted to neutral.

JP-A-11-311314 describes a system for setting a jerk according to the position of the accelerator pedal. Specifically, the system sets the jerk to be a predetermined relatively small value when the position of the accelerator pedal is within a predetermined range. The system sets the jerk to be a larger value for a lower position of the accelerator pedal, when the position of the accelerator pedal is equal to or lower than the predetermined value.

The driving force control system described in JP-A-2009-121238 is configured to select a gear stage on the basis of the position of the accelerator pedal and the vehicle speed. Specifically, downshifting and the resulting increase in the driving force do not occur, unless the position of the accelerator pedal is not lowered enough to satisfy a downshift condition. Unfortunately, this configuration might result in a failure to increase the driving force according to an acceleration demand, issued with the accelerator pedal further depressed, when torque response delay or the like occurs due to a change in an operation status of the engine. In other words, the driving force might temporarily plateau or be in the other like status to be unable to reflect an accelerating operation by the driver. An example of the change in the operation status of the engine described above includes a shift from an NA region where the engine is operated in a natural aspiration manner to a supercharge region where the engine is driven with a supercharger operated. The driving force might fail to reflect the accelerating operation also when the engine torque temporarily reduced after the downshift condition has been satisfied increases to a torque based on the amount of operation on the accelerator pedal at a constant increasing rate.

Thus, the control system described in JP-A-2016-205454 sets the increasing rate of the torque to be high when the depressing speed of the accelerator pedal is higher than the predetermined value, so that a difference between the torque demanded by the driver and the actual torque can be reduced or eliminated. However, the system cannot reduce or eliminate a period during which the driving force plateaus due to the torque response delay described above and the like. Thus, the system also involves a risk that the driving force does not reflect the accelerating operation. The system further involves a risk that the driving force temporarily plateaus or changes stepwise due to speed change operation, resulting in a failure to achieve the driving force reflecting the accelerating operation by the driver.

SUMMARY

Aspects of the present disclosure have been conceived noting the foregoing technical problems, and it is therefore an object of the present disclosure is to provide a driving force control system for a vehicle configured to control a driving force based on the accelerating operation by the driver.

A driving force control system according to the embodiment of the present disclosure is applied to a vehicle comprises: a drive unit including a prime mover and an automatic transmission in which a speed ratio is changeable; an accelerator device operated by a driver; and a controller that controls a torque generated by the prime mover. In order to achieve the above-explained objective, according to the embodiment, the controller is configured to: calculate an operating amount of the accelerator device: calculate an operating speed of the accelerator device; calculate a target jerk of the vehicle based on the operating speed of the accelerator device; and control an output torque of the drive unit on the basis of the target jerk when the operating amount is equal to or smaller than a predetermined amount, and the operating speed is equal to or slower than a predetermined speed set.

In a non-limiting embodiment, the controller may be further configured to: calculate an acceleration at which a change in an acceleration of the vehicle plateaus when the torque of the prime mover is increased while maintaining a gear stage of the automatic transmission, and shift the gear stage of the automatic transmission to a gear stage of higher speed ratio before an actual acceleration of the vehicle reaches the acceleration at which a change in the acceleration plateaus.

In a non-limiting embodiment, the controller may be further configured to calculate the acceleration at which a change in the acceleration plateaus on the basis of the operating speed of the accelerator device.

In a non-limiting embodiment, the prime mover may include an engine having a supercharger that supplies pressurized air, the controller may be further configured to operate the supercharger when a torque demanded to the engine is equal to or greater than a predetermined torque, and the acceleration at which a change in the acceleration plateaus may include an acceleration at which the torque demanded to the engine reaches a torque at which the supercharger is operated.

In a non-limiting embodiment, the controller may be configured to reduce an increasing rate of a driving force of the drive unit when the acceleration of the vehicle is equal to or greater than a predetermined acceleration.

In a non-limiting embodiment, the predetermined acceleration may include an acceleration that allows the driver to feel the acceleration satisfactory.

In a non-limiting embodiment, the controller may comprise a map to calculate the target jerk on the basis of: a time in which the acceleration of the vehicle is kept constant; a difference in the acceleration of the vehicle from a point at which an operation of the accelerator device has been started; the operating speed of the accelerator device; and the vehicle speed.

Thus, according to the embodiment, the target jerk of the vehicle is calculated based on the operating speed of the accelerator, and the output torque of the prime mover is controlled on the basis of the target jerk, when the operating amount of the accelerator device is equal to or smaller than the predetermined amount and the operating speed of the accelerator is equal to or lower than the predetermined speed. The driver is allowed to sense an intended acceleration if the jerk of the vehicle changes according to the operating speed of the accelerator pedal. According to the embodiment, therefore, the output torque of the prime mover can be controlled as intended by the driver to improve an acceleration feeling.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Figure 1:
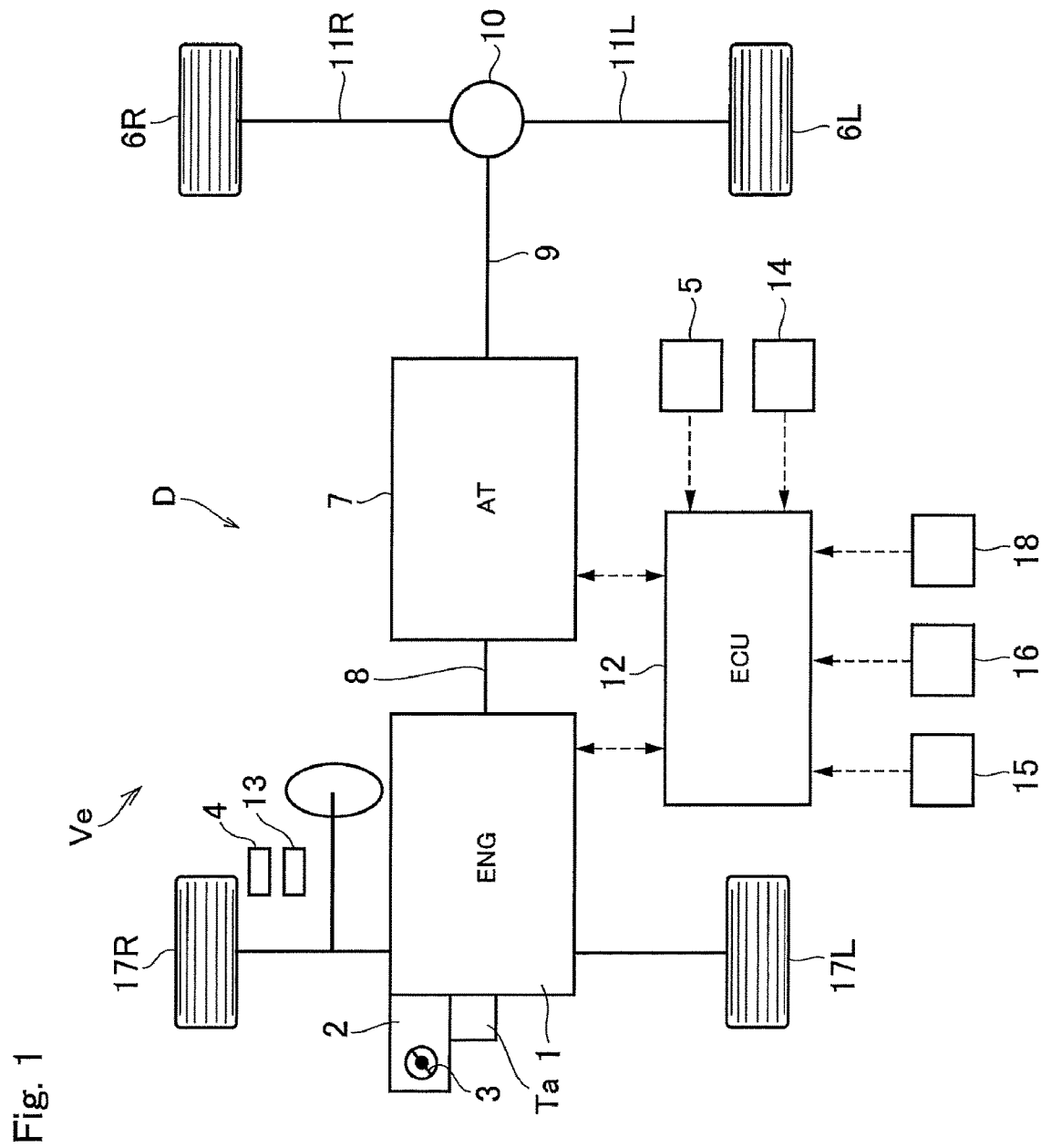
FIG. 1 is a schematic illustration showing a structure of the vehicle to which the control system according to the embodiment is applied.

FIG. 1 shows an example of a vehicle Ve having a drive unit D according to an embodiment of the disclosure. The drive unit D comprises an engine (referred to as "ENG" in FIG. 1) 1 as a prime mover and an automatic transmission (referred to as "AT" in FIG. 1) 7. For example, a gasoline engine and a diesel engine may be employed as the engine 1, and the engine 1 is provided with an electronic throttle valve 2 to control an air intake of the engine 1 and an air flow meter 3 to detect the air intake. According to the example shown in FIG. 1, the engine 1 is further provided with a supercharger Ta that is activated to supply compressed air to the engine 1 when a torque greater than a predetermined magnitude is demanded.

The electronic throttle valve 2 is adapted to control air supply to the engine 1 on the basis of a command signal transmitted from an after-mentioned electronic control unit (to be abbreviated as the "ECU" hereinafter) 12. Specifically, the electronic throttle valve 2 controls the air intake of the engine 1 on the basis of a position of an accelerator pedal 4 depressed by the driver, as an accelerating device of the embodiment, detected by an accelerator sensor 5.

The vehicle Ve shown in FIG. 1 is a front-engine rear-drive layout vehicle in which output torque of the engine 1 is delivered to a pair of rear wheels 6R and 6L to propel the vehicle Ve. The automatic transmission (as will be simply called the "transmission" hereinafter) 7 is disposed in a torque transmission route between the engine 1 and a pair of rear wheels 6R and 6L to change an operating point (mainly a speed) of the engine 1. An output shaft of the engine 1 is connected to a torque converter and a torque converter clutch (neither of which are shown). An output shaft (i.e., a turbine shaft) 8 of the torque converter is connected to the transmission 7.

A speed ratio of the transmission 7 may be changed stepwise. For example, a geared automatic transmission adapted to change a speed ratio by manipulating engagement devices such as a clutch and a brake (neither of which are shown) to change the torque transmission route may be used as the automatic transmission 7. Instead, a belt-driven continuously variable transmission in which a speed ratio is varied continuously by changing an effective running diameter of a belt applied to a pulley may also be used as the automatic transmission 7. Further, a hybrid mechanism in which a differential mechanism serving as a power split mechanism is connected to the engine 1, a motor-generator, and an output member, and in which a speed of the engine 1 is changed continuously by the motor-generator may also be used as the automatic transmission 7. In a vehicle having the continuously variable transmission, a plurality of speed ratios or gear stages are set in advance so that the speed ratio is changed stepwise.

An output shaft of the transmission 7 is connected to a pair of rear wheels 6R and 6L through a propeller shaft 9, a differential gear 10, and a pair of drive shafts 11R and 11L.

The output torque of the engine 1 and a shifting operation of the transmission 7 are controlled by the ECU 12 as a controller. In other words, the output torque of the drive unit D is controlled by the ECU 12. The ECU 12 is composed mainly of a microcomputer that is configured to carry out a calculation based on incident data and preinstalled data, and to transmit a calculation result in the form of command signal. For example, the ECU 12 receives data from the accelerator sensor 5 that detects a position of the accelerator pedal 4, a brake sensor 14 that detects an operating amount (a depression or a pedal force) of a brake pedal 13, a sensor 15 that detects an engine speed (or a speed of the turbine shaft 8), a sensor 16 that detects a speed of the output shaft of the transmission 7, the air flow meter 3, and a wheel speed sensor 18 that detects speeds of the front wheels 17R and 17L and the rear wheels 6R and 6L. Those data are stored in the ECU 12 for a predetermined time.

Specifically, a shift map for changing the speed ratio stepwise, a control flow, formulas for processing data on the basis of the incident signals and so on are stored in the ECU 12.

In order to control output of the engine 1, the ECU 12 transmits results of the data processing using the above-described control flow and formulas to a fuel supply valve, an ignition plug (neither of which are shown), and the electronic throttle valve 2 in the form of control signals. Given that the automatic transmission 7 is a geared automatic transmission, the ECU 12 transmits a downshift command to manipulate the engagement devices of the transmission 7. In addition, the ECU 12 transmits the signals to the other devices such as a lock-up clutch (not shown).

Figure 2:
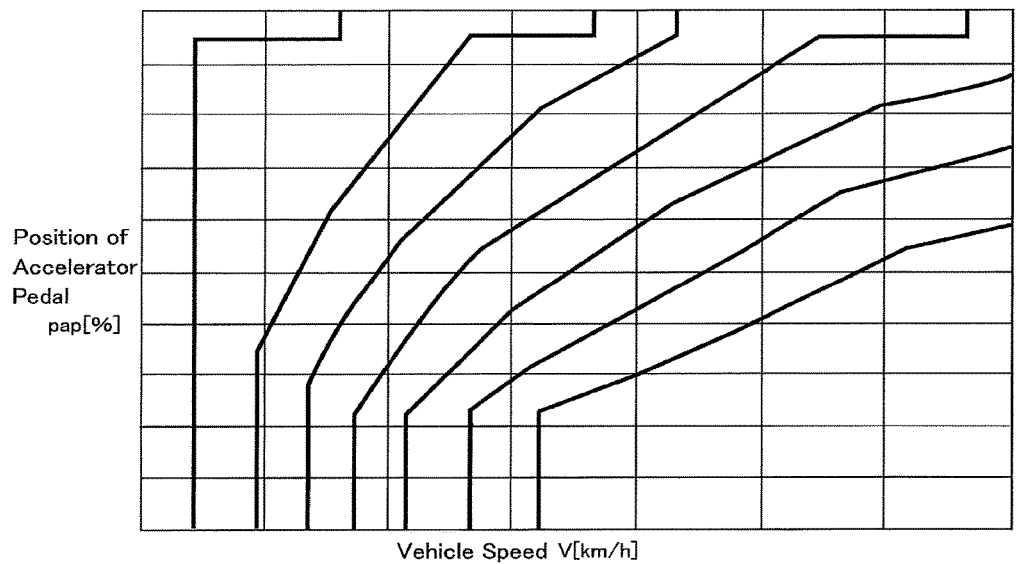
FIG. 2 shows one example of a shift map.

As shown in FIG. 2, in the shift map installed in the ECU 12, the gear stages of the transmission 7 are determined on the basis of a vehicle speed V and a position of the accelerator pedal (as will be also called the "depression of the accelerator pedal") pap representing a required driving force. In FIG. 2, the horizontal axis represents the vehicle speed V, and the vertical axis represents the depression of the accelerator pedal pap. In FIG. 2, only downshift lines are drawn, and upshift lines are omitted for the sake of convenience. Specifically, a determination to execute a downshifting is made when the vehicle speed V is reduced across the downshift line from the high speed side to the low speed side (i.e., from right to left in FIG. 2), and when the depression of the accelerator pedal 4 is increased across the downshift line from the smaller depression side to the greater depression side (i.e., from the lower side to the upper side in FIG. 2). As a result, the gear stage is shifted downwardly to a target stage.

When the operating point governed by the vehicle speed V and the depression of the accelerator pedal pap is shifted across a plurality of downshift lines, a skipshift may be executed to downshift the gear stage to the target stage while skipping at least one stage. Alternatively, the gear stage may be changed stage by stage. The vehicle speed V may be obtained on the basis of the data transmitted from the sensor 16 that detects a speed of the output shaft of the transmission 7 and the wheel speed sensor 18. The driving force demanded by the driver may also be determined on the basis of a detection value of a sensor that detects an opening degree of a throttle valve (not shown) instead of the depression of the accelerator pedal pap.

In the vehicle Ve, the gear stage of the transmission 7 is shifted with reference to the shift map when the vehicle speed V is changed in spite of keeping the position of the accelerator pedal pap. In order to evaluate acceleration feeling sensed by the driver when the acceleration is changed according to a change in the position of the accelerator pedal pap, the applicant of the present disclosure has conducted a sensory test of the acceleration. A result of the sensory test indicates that when the driver gradually depresses the accelerator pedal 4 to accelerate the vehicle Ve, the driver is allowed to sense the intended acceleration if a jerk J changes according to the depressing speed of the accelerator pedal 4 (according to a change rate dpap/dt of the position of the accelerator pedal 4). In the following description, the operating speed dpap/dt of the accelerator pedal 4 represents the changing speed of the position of the accelerator pedal.

Figure 3:
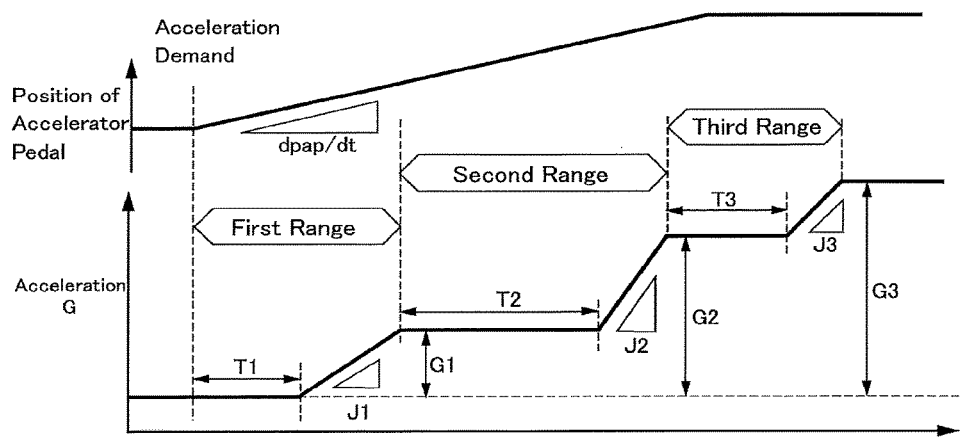
FIG. 3 is a graph indicating changes an accelerator operating speed and an acceleration in a sensory test.

In the sensory test, the position of the accelerator pedal pap, the operating speed dpap/dt of the accelerator pedal 4, a change ΔG of an acceleration G from a point at which the accelerating operation is executed, the jerk J in an acceleration transitional phase, and a time period T until the acceleration G is changed, were employed as parameters. The result of the sensory test is indicated in FIG. 3. Specifically, in the sensory test, the acceleration G of the vehicle Ve was changed by depressing the accelerator pedal 4 at the predetermined operating speed dpap/dt during propulsion of the vehicle Ve at a constant speed, and FIG. 3 indicates a change in the acceleration G from a point at which the acceleration G was increased. As indicated in FIG. 3, the acceleration G was changed as in a case of controlling the speed change operation and the torque of the engine 1 in a conventional manner. When the accelerator pedal 4 is depressed, the acceleration is still "0". That is, the change ΔG of the acceleration G from the point at which the accelerator pedal 4 is depressed is taken as synonymous with the absolute value of the acceleration G.

In FIG. 3, the first plateau period T1 is a time period until the acceleration G was increased to a predetermined acceleration (hereinafter, referred to as sensible acceleration) Gre from the point at which the accelerator pedal 4 was depressed. The sensible acceleration Gre is an acceleration that the driver is allowed to sense a change in behavior of the vehicle Ve caused by the accelerating operation, and the sensible acceleration Gre is set to a smaller value with a reduction in the vehicle speed V based on an experimental result. For example, the first plateau period T1 varies depending e.g., on a response time until the engine torque starts increasing from a point at which the accelerator pedal 4 is depressed.

The change rate of the acceleration G temporarily becomes substantially "0" after the acceleration G increases to a first plateau magnitude G1. If the engine 1 is operated in a natural aspiration mode when depressing the accelerator pedal 4, a response delay to increase the torque may be caused by activating the supercharger Ta. Likewise, if the driving force is increased to a maximum possible value in the current gear stage, a shifting operation may be caused with some delay. For these reasons, the acceleration G plateaus at the first plateau magnitude G1. In the description below, a change rate of the acceleration G from a point at which the acceleration G starts changing at the end of the first plateau period T1 to a point at which the acceleration G reaches the first plateau magnitude G1 will be called a "first jerk J1".

When the acceleration G is increased from the first plateau magnitude G1 to a second plateau magnitude G2 by the execution of the speed change operation or the activation of the supercharger Ta, the acceleration 0 plateaus again at the second plateau magnitude G2. That is, the acceleration G plateaus due to the change in the operating condition (i.e., an aspiration manner) of the engine 1 or the speed ratio, as in the case where the acceleration G plateaus at the first plateau magnitude G1. In the following description, a period from a point at which the acceleration G reaches the first plateau magnitude G1 to a point at which the acceleration 6 starts increasing again will be called a "second plateau period T2", and a change rate of the acceleration G from a point at which the acceleration G starts changing at the end of the second plateau period T2 to a point at which the acceleration G reaches the second plateau magnitude G2 will be called a "second jerk J2".

When the acceleration G is further increased from the second plateau magnitude G2 to a third plateau magnitude G3 by the execution of the speed change operation or the activation of the supercharger Ta, the acceleration G plateaus again at the third plateau magnitude G3. Specifically, the acceleration G plateaus due to the change in the operating condition of the engine 1 or the speed ratio, as in the cases described above. In the flowing description, a period from a point at which the acceleration G reaches the second plateau magnitude G2 to a point at which the acceleration G starts increasing again will be called a "third plateau period T3", and a change rate of the acceleration G from a point at which the acceleration G starts changing at the end of the third plateau period T3 to a point at which the acceleration G reaches the third plateau magnitude G3 will be called a "third jerk J3".

In the example shown in FIG. 3, the acceleration feeling of the driver can be evaluated based on a sum of scores in a first range, a second range, and a third range. Specifically, the first range is a period until the acceleration G reaches the first plateau magnitude G1 from the point at which the acceleration pedal 4 is depressed, the second range is a period until the acceleration G reaches the second plateau magnitude 62 from a commencement of the second plateau period T2, and the third range is a period until the acceleration G reaches the third plateau magnitude G3 from a commencement of the third plateau period T3.

The score of the acceleration feeling in the first range can be expressed by a regression equation using the first plateau period T1, the first jerk J1, the first plateau magnitude G1, the operating speed dpap/dt of the accelerator pedal 4, and the vehicle speed V as parameters obtained from the sensory test. The relationship among the parameters is defined in the form of a map stored in the ECU 12.

Figure 4:
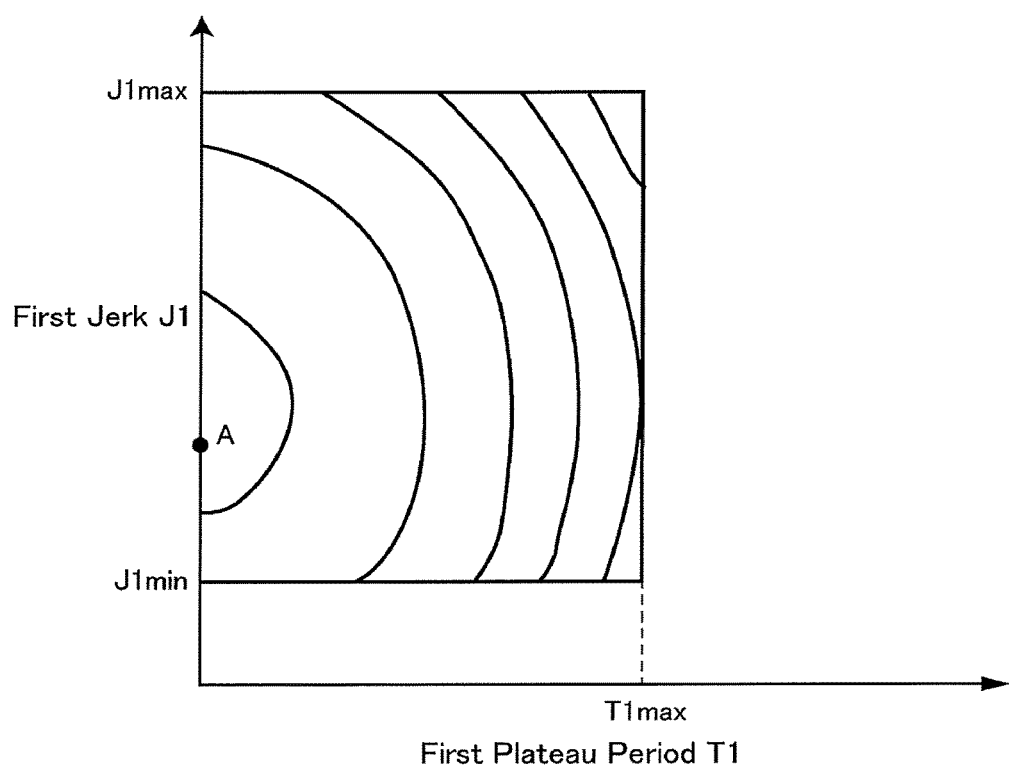
FIG. 4 illustrates an example of a first driving force map.

FIG. 4 shows an example of a map for obtaining the score in the first range. More specifically, FIG. 4 shows relationship between the first plateau period T1 and the first jerk J1 in a case that the vehicle speed V is a first vehicle speed V1, the accelerator pedal 4 is depressed at a first operating speed dpap/, and the acceleration G plateaus at the first plateau magnitude G1. In the first range, a higher score of the acceleration feeling is obtained with a reduction in the first plateau period T1 until the driver starts sensing a change in the behavior of the vehicle Ve caused by the accelerating operation. Given that the first jerk J1 is excessively greater with respect to the first operating speed dpap/dtl, the driver may feel acceleration more than expected. By contrast, given that the first jerk J1 is excessively smaller with respect to the first operating speed dpap/dtl, the driver may not feel desired acceleration. That is, in the first range, the score of the acceleration feeling becomes higher with a reduction in the first plateau period T1, and as the first jerk J1 approaches a point A. In FIG. 4, T1*max* is a longest acceptable plateau period T1 by the driver, J1*max* is a largest acceptable first jerk J1 by the driver, and J1*min* is a smallest acceptable first jerk J1 by the driver. The longest acceptable plateau period T1*max,* the largest acceptable first jerk J1*max,* and the smallest acceptable first jerk J1*min* are set in advance on the basis of an experimental result.

When the accelerator pedal 4 is depressed relatively gently, the driver may sense the acceleration feeling sufficiently with an increase in the acceleration G to a target acceleration Gpr determined in accordance with the position of the accelerator pedal pap. The target acceleration Gpr is set in advance in such a manner as to be increased with an increase in the depression of the accelerator pedal pap on the basis of an experimental result. In the following description, the target acceleration Gpr is referred to as an interim target acceleration Gpr for the sake of convenience. If the interim target acceleration Gpr is smaller than the first plateau magnitude G1, the output torque of the engine 1 is controlled on the basis of the relationship illustrated in FIG. 4 without executing a speed change operation.

By contrast, If the interim target acceleration Gpr is equal to or greater than the first plateau magnitude G1, a speed change operation is executed to increase the acceleration G. As a result, the acceleration G plateaus due to the speed change operation and the second range is started. The speed change operation is executed even if the acceleration G plateaus at the first plateau magnitude G1 due to response delay of torque resulting from activation of the supercharger Ta. As a result, a temporal stagnation in the acceleration G can be prevented to achieve a higher score when the driver depresses the accelerator pedal 4 at a constant speed.

The score of the acceleration feeling in the second range can be expressed by a regression equation using the first plateau magnitude G1, the second plateau period T2, the second jerk J2, a difference between the second plateau magnitude G2 and the first plateau magnitude G1, the operating speed dpap/dt of the accelerator pedal 4, and the vehicle speed V as parameters obtained on the basis of the result of the sensory test. The relationship among the parameters is also defined in the form of a map stored in the ECU 12. In the following description below, this map for determining the score in the second range is referred to as a second driving force map.

Figure 5:
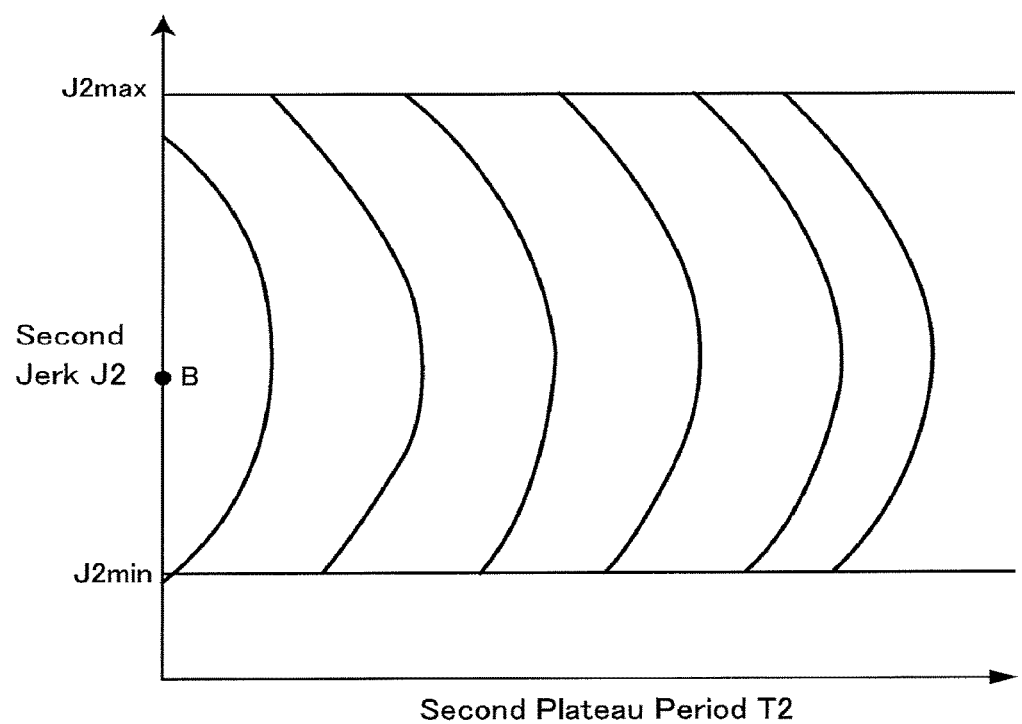
FIG. 5 illustrates an example of a second driving force map.

FIG. 5 shows an example of a map for obtaining the score in the second range. More specifically, FIG. 5 illustrates relationship between the second plateau period T2 and the second jerk J2 in a case that the vehicle speed V is the first vehicle speed V1, the accelerator pedal 4 is depressed at the first operating speed dpap/dtl, and the acceleration G plateaus at the first plateau magnitude G1 and the second plateau magnitude 62. Since the driver expects the acceleration G to be continuously increased, it is preferable to increase the acceleration G without causing a plateau resulting from execution of the speed change operation. That is, a time period until the acceleration G starts increasing again after the commencement of the second plateau period T2 is preferably short. Given that the second jerk J2 is excessively larger with respect to the first operating speed dpap/dtl, the driver may feel acceleration more than expected. By contrast, given that the second jerk J2 is excessively smaller with respect to the first operating speed dpap/dtl, the driver may not feel desired acceleration. That is, in the second range, the score of the acceleration feeling becomes higher with a reduction in the second plateau period T2, and as the second jerk J2 approaches a point B. In FIG. 5, J2*max* is a largest acceptable second jerk J2 by the driver, and J2*min* is a smallest acceptable second jerk J2 by the driver. The largest acceptable second jerk J2*max* and the smallest acceptable second jerk J2*min* are set in advance on the basis of an experimental result.

If the second plateau magnitude G2 is equal to or larger than the interim target acceleration Gpr, the output torque of the engine 1 is controlled on the basis of the relationship illustrated in FIG. 5, without executing a speed change operation again. By contrast, if the second plateau magnitude G2 is smaller than the interim target acceleration Gpr, a speed change operation is executed again. Consequently, the third range in FIG. 3 is started.

Figure 6:
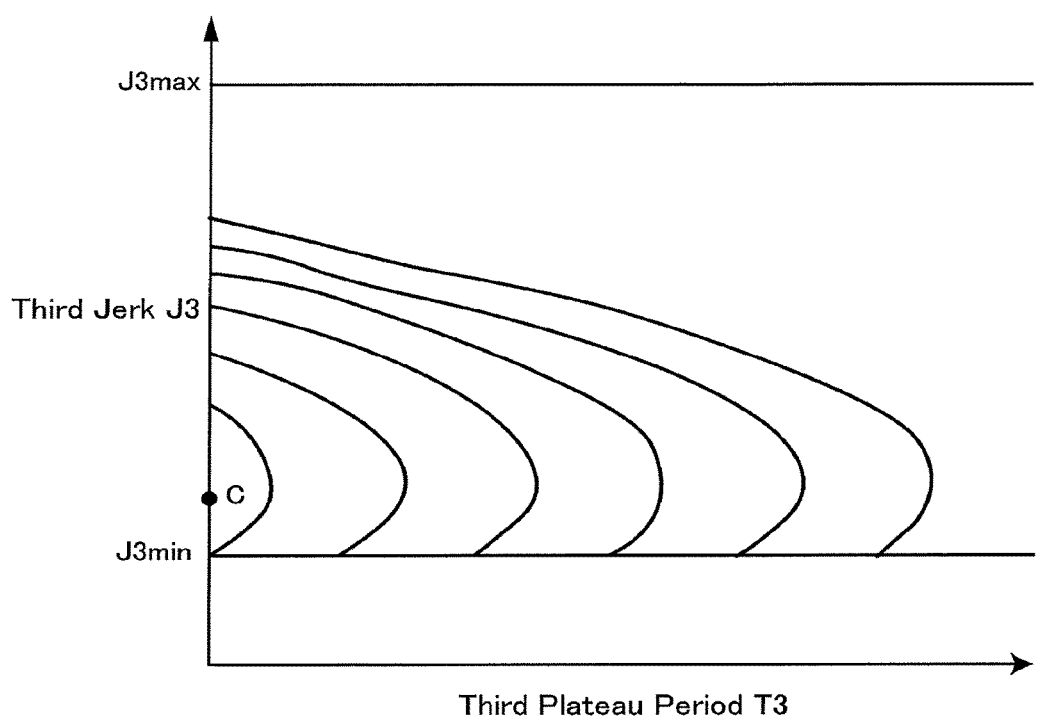
FIG. 6 illustrates an example of a third driving force map.

FIG. 6 shows an example of a map for obtaining the score in the third range. The score in the third range can be expressed by a regression equation using the second plateau magnitude G2, the third plateau period T3, the third jerk J3, a difference between the third plateau magnitude G3 and the second plateau magnitude G2, the operating speed dpap/dt of the accelerator pedal 4, and the vehicle speed V as parameters obtained on the basis of the sensory test. The relationship among the parameters is also defined in the form of a map stored in the ECU 12, as in the case with the first range. In the following description, the map for determining the score in the first range is referred to as a first driving force map, the map for determining the score in the second range is referred to as a second driving force map, and the map for determining the score in the third range is hereinafter referred to as a third driving force map.

More specifically, FIG. 6 shows relationship between the third plateau period T3 and the third jerk J3 in a case that the vehicle speed V is the first vehicle speed V1, the accelerator pedal 4 is depressed at the first operating speed dpap/dtl, and the acceleration G plateaus at the second plateau magnitude G2 and the third plateau magnitude G3. As described above, since the driver expects the acceleration G to be continuously increased, it is preferable to increase the acceleration G without causing a plateau resulting from execution of the speed change operation. That is, a time period until the acceleration G starts increasing again after the commencement of the second plateau period T3 is preferably short.

Given that the third jerk J3 is excessively large with respect to the first operating speed dpap/dtl, the driver may feel acceleration more than expected. By contrast, given that the third jerk J3 is excessively smaller with respect to the first operating speed dpap/dtl, the driver may not feel desired acceleration. That is, in the third range, the score of the acceleration feeling becomes higher with a reduction in the third plateau period T3, and as the third jerk J3 approaches a point C. In FIG. 6, J3*max* is a largest acceptable third jerk J3 by the driver, and J3*min* is a smallest acceptable third jerk J3 by the driver. The largest acceptable third jerk J3*max* and the smallest acceptable third jerk J3*min* are set in advance on the basis of an experimental result.

Figure 7:
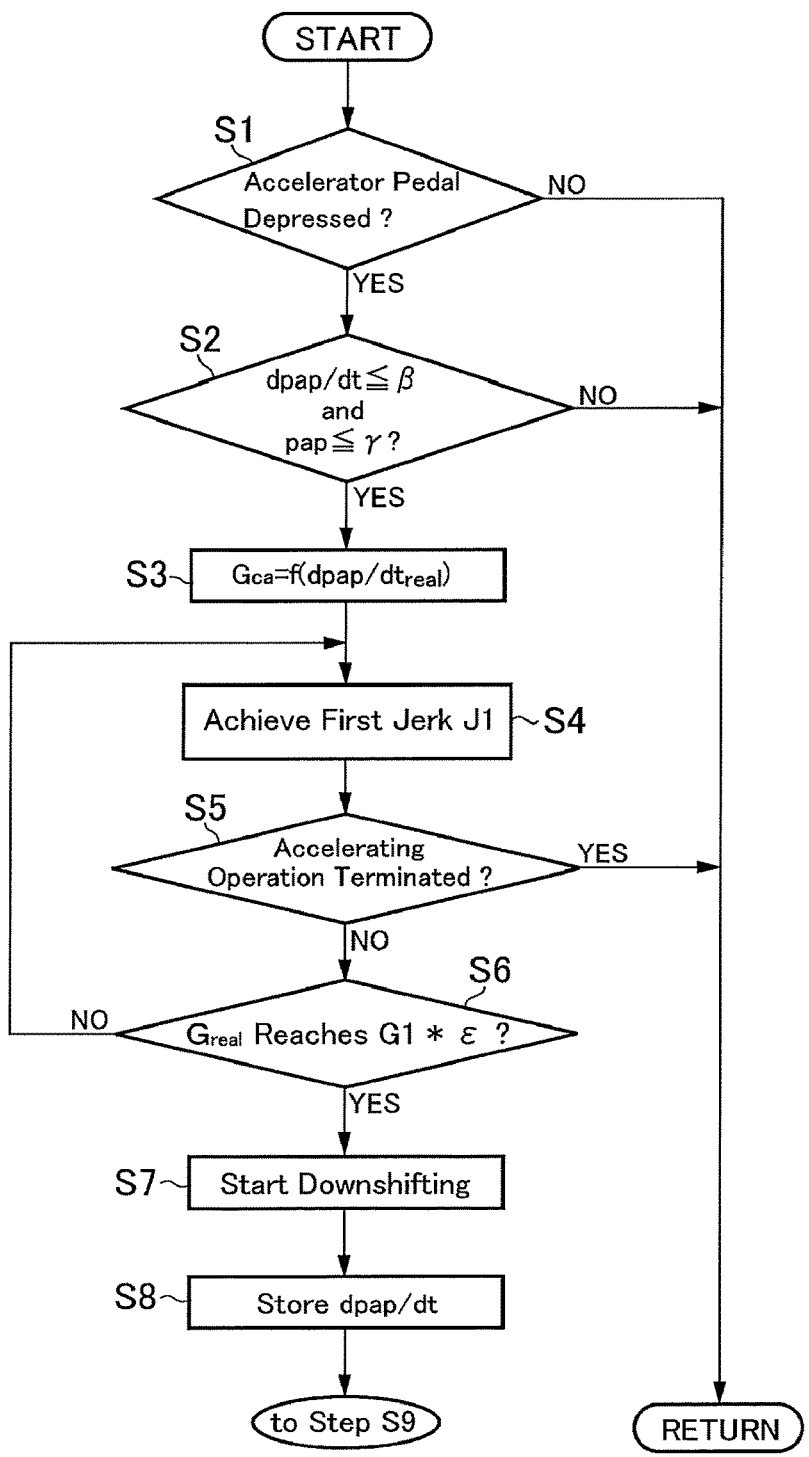
FIG. 7 is a flowchart showing step S1 to step S8 of a routine executed by the driving force control system according to the embodiment.
Figure 8:
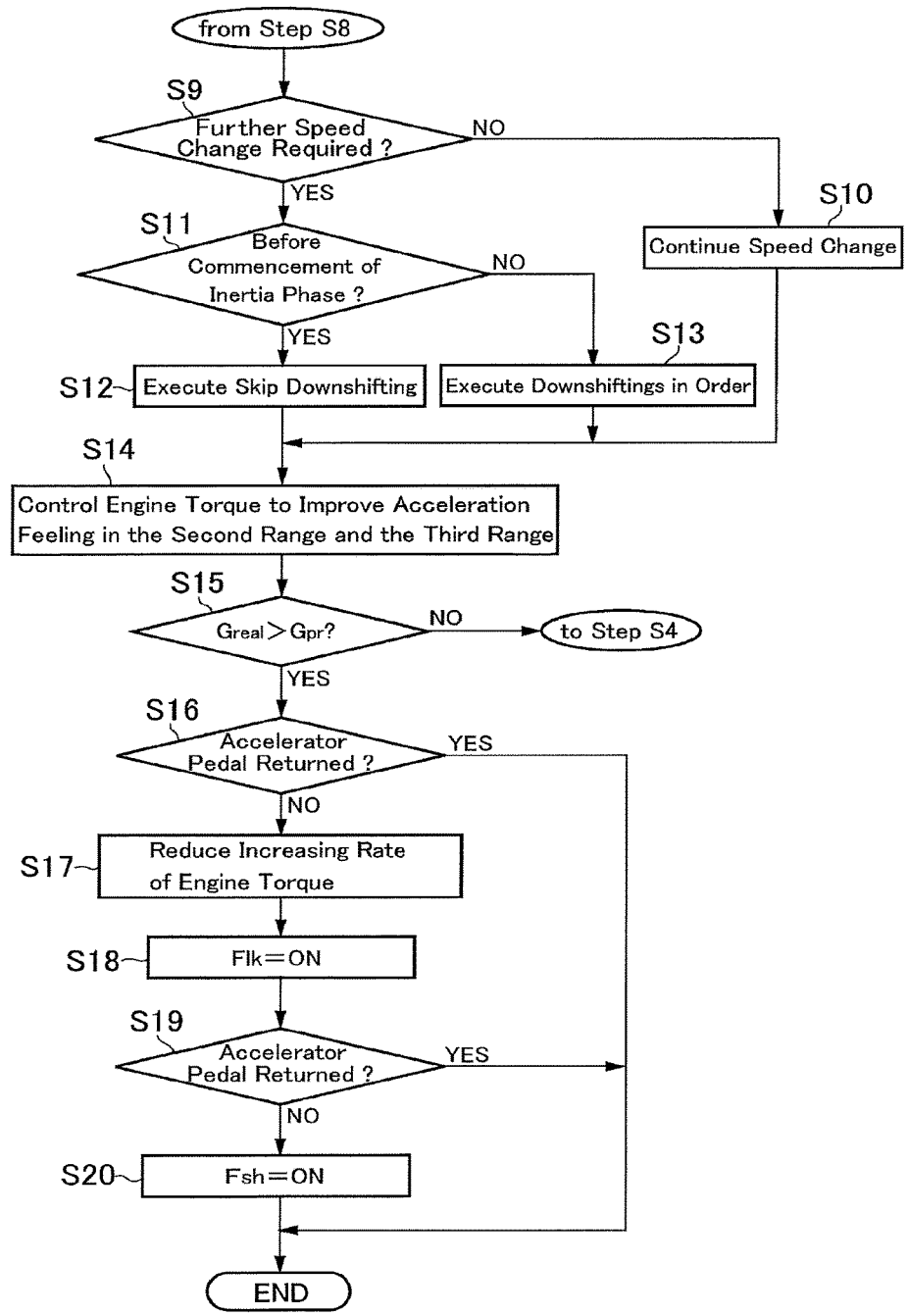
FIG. 8 is a flowchart showing step S9 to step S20 of the routine executed by the driving force control system according to the embodiment.

The ECU 12 is configured to control an output torque of the drive unit D by setting a target jerk Jtgt in such a manner as to improve acceleration feeling of the driver according to the operating speed dpap/dt of the accelerator pedal 4, on the basis of the relationships shown in FIG. 4 to FIG. 6. An example of such routine is shown in FIGS. 7 and 8. Although the routine is divided into FIGS. 7 and 8, the routine may be implemented as a single routine.

At step S1, it is determined whether the driver has depressed the accelerator pedal 4 to accelerate the vehicle Ve. For example, at step S1, it is determined whether a change Δpap of the position of the accelerator pedal 4 detected by the accelerator sensor 5 is equal to or greater than a first threshold a.

If the accelerator pedal 4 is not depressed so that the answer of step S1 is NO, the routine is returned. By contrast, if the accelerator pedal 4 is depressed so that the answer of step S1 is YES, the routine progresses to step S2 to determine whether the operating speed dpap/dt of the accelerator pedal 4 is equal to or lower than a predetermined speed ß set in advance and whether the (absolute value of) depression of the accelerator pedal pap is equal to or smaller than a predetermined value γ (i.e., whether the depression of the accelerator pedal 4 is smaller than the predetermined value γ). Specifically, at step S2, it is determined whether it is necessary to generate the jerk J according to the operating speed dpap/dt of the accelerator pedal 4 so as to allow the driver to sense the intended acceleration. To this end, the predetermined speed ß is set based on an experimental result to be a criterion to determine whether the jerk J according to the operating speed dpap/dt of the accelerator pedal 4 is required. In this situation, the absolute value of the depression of the accelerator pedal pap is set to be equal to or smaller than the predetermined position γ.

If the operating speed dpap/dt of the accelerator pedal 4 is higher than the predetermined speed ß or the depression of the accelerator pedal pap is greater than the predetermined position γ so that the answer of step S2 is NO, the routine is returned. By contrast, if the operating speed dpap/dt of the accelerator pedal 4 is equal to or lower than the predetermined speed ß 5 and the depression of the accelerator pedal pap is equal to or smaller than the predetermined position γ so that the answer of step S2 is YES, the routine progresses to step S3 to calculate a theoretical value Gca of the acceleration G on the basis of an actual operating speed dpap/dtreal of the accelerator pedal 4. At step S3 the theoretical value Gca is calculated without taking account of the response delay of the engine 1 or the like, and hence an actual acceleration Greal increases with a temporal delay behind the theoretical value Gca. Specifically, the theoretical value Gca may be calculated by substituting the actual operating speed dpap/dtreal of the accelerator pedal 4 into a motion equation of the vehicle Ve stored in advance in the ECU 12.

Then, at step S4, the first jerk J1 is achieved to improve acceleration feeling in the first range. To this end, first of all, a target jerk Jtgt of the first jerk J1 is calculated with reference to the first driving force map, on the basis of a current vehicle speed Vreal, the operating speed dpap/dt of the accelerator pedal 4 representing a time rate of change in the depression of the accelerator pedal pap detected by the accelerator sensor 5, and the first plateau magnitude G1. Specifically, the first plateau period T1 is calculated in such a manner that the first plateau period T1 is reduced as short as possible, and the target value Jtgt of the first jerk J1 is calculated in such a manner that the target value Jtgt of the first jerk J1 is set as close as possible to the point A in the first driving force map, within a structural limitation of the drive unit D. Then, the output torque of the engine 1 is controlled on the basis of the target jerk Jtgt thus calculated. In an initial stage of acceleration, the first jerk J1 may be achieved by merely controlling the output torque of the engine 1 without executing a speed change operation.

Then, in order to determine whether the driver still desires to accelerate the vehicle, it is determined at step S5 whether the accelerating operation has been terminated. In other words, it is determined whether the depression of the accelerator pedal pap is still increasing. For example, the determination at step S5 may be made by determining whether the change rate dpap/dt of the position of the accelerator pedal 4 is greater than "0".

If the depression of the accelerator pedal pap is kept constant or decreasing so that the answer of step S5 is NO, the routine is returned. As described above, the actual acceleration Greal increases with a temporal delay behind the theoretical value Gca of the acceleration G, therefore the theoretical value Gca of the acceleration G is greater than the actual acceleration Greal. In addition, the acceleration theoretical value Gca is calculated using the motion equation for the vehicle Ve. For these reasons, the first plateau magnitude G1 may be calculated beforehand when the actual acceleration Greal is still relatively small. If the depression of the accelerator pedal pap is increasing so that the answer of step S5 is YES, the routine progresses to step S6 to determine whether the actual acceleration Greal has reached a predetermined percentage ε (e.g., 80%) of the first plateau magnitude G1. To this end, the first plateau magnitude G1 can be obtained based on the theoretical value Gca of the acceleration G calculated at step S3. The actual acceleration Greal can be detected by a longitudinal acceleration sensor arranged in the vehicle Ve, or can be calculated by differentiating the vehicle speed V detected by the wheel speed sensor 18.

If the actual acceleration Greal has not reached the predetermined percentage ε of the first plateau magnitude G1 so that the answer of step S6 is NO, the routine returns to step S4. That is, the engine torque control to achieve the target jerk Jtgt is repeated until the actual acceleration Greal reaches the predetermined percentage ε of the first plateau magnitude G1.

By contrast, if the actual acceleration Greal has reached the predetermined percentage ε of the first plateau magnitude G1 so that the answer of step S6 is YES, the routine progresses to step S7 to start the downshifting before the actual acceleration Greal reaches the first plateau magnitude G1 to shorten the second plateau period T2. Then, at step S8, the operating speed dpap/dt of the accelerator pedal 4 after the downshifting is stored in the ECU 12. The downshifting at step S7 is executed to shift the gear stage to a target gear stage at which the interim target acceleration Gpr based on the current depression of the accelerator pedal pap can be achieved. This means that the target gear stage is not limited to a gear stage that is immediately lower than the current gear stage.

As described above, the interim target acceleration Gpr is set to be a larger value with an increase in the depression of the accelerator pedal pap. That is, if the accelerator pedal 4 is further depressed within a shift transitional phase, the interim target acceleration Gpr is increased. In this case, the interim target acceleration Gpr thus increased may not be achieved in the target gear stage to be shifted by the speed change operation executed at step S7. At step S9, therefore, it is determined whether a further speed change operation is required. Specifically, at step S9, it is determined whether the interim target acceleration Gpr cannot be achieved in the gear stage shifted by the downshifting due to the increase in the depression of the accelerator pedal pap during the shift transitional phase.

If further speed change operation is not required so that the answer of step S9 is NO, the routine progresses to step S10 to continue the speed change operation executed at step S7. By contrast, if further speed change operation is required so that the answer of step S9 is YES, the routine progresses to step S11 to determine whether an inertia phase still has not been started. For example, in a case of interrupting the speed change operation after the commencement of the inertia phase, a complicated speed change control is required. In addition, if the speed change operation is interrupted after the commencement of the inertia phase, the engine speed may be changed abruptly. Therefore, at step S11, it is determined whether to complete the current speed change operation and then start downshifting again, or to execute skip downshifting to a gear stage lower than the target gear stage set at step S7 while interrupting the current speed change operation.

If the inertia phase has not yet been started so that the answer of step S11 is YES, the routine progresses to step S12 to execute skip downshifting. By contrast, if the inertia phase has already started so that the answer of step S12 is NO, the routine progresses to step S13 to complete the current speed change operation and then execute the downshifting again.

After execution of steps S10, S12, or S13, at step S14, the torque of the engine 1 is controlled in such a manner as to improve the acceleration feeling in the second range or in the third range. Specifically, the target jerk Jtgt of the second jerk J2 or the third jerk J3 is calculated with reference to the second driving force map or the third driving force map, and the torque of the engine 1 is controlled to achieve the target jerk Jtgt. The target jerk Jtgt may be calculated based on the operating speed dpap/dt of the accelerator pedal 4 stored at step S8, and other parameters used at step S4 about the current traveling conditions.

Then, at step S15, it is determined whether the actual acceleration Greal exceeds the interim target acceleration Gpr. If the actual acceleration Greal does not exceed the interim target acceleration Gpr so that the answer of step S15 is NO, the routine returns to step S4 to execute the speed change operation again. By contrast, if the actual acceleration Greal exceeds the interim target acceleration Gpr so that the answer of step S15 is YES, the routine progresses to step S16 to determine whether the accelerator pedal 4 is returned. This step S16 is carried out to determine whether the current routine has to be continued or other kind of control has to be executed. Such determination at step S16 may be made based on a detection value of the accelerator sensor 5.

If the accelerator pedal 4 is returned so that the answer of step S16 is YES, the routine is returned. By contrast, if the accelerator pedal 4 is not been returned so that the answer of step S16 is NO, the routine progresses to step S17 to reduce the increasing rate of the torque of the engine 1. If the actual acceleration Greal exceeds the interim target acceleration Gpr as described above, the driver is less likely to feel the uncomfortable feeling even when the jerk J is reduced. Therefore, at step S17, the jerk J is reduced so that the actual acceleration Greal reaches the acceleration G according to the position of the accelerator pedal pap. This prevents shock occurring due to the change of the actual acceleration Greal to the acceleration G (constant value) based on the position of the accelerator pedal pap. The increasing rate of the torque at step S17 may be not only a fixed value determined in advance but also a variable value on the basis of the acceleration G.

In the case that the interim target acceleration Gpr exceeds the actual acceleration Greal at step S15, this means that the engagement state of an engagement device has been switched to shift the gear stage. At step S18, therefore, a determination flag Flk of a switching operation of the engagement device is turned on. Then, the routine progresses to step S19 to determine whether the accelerator pedal 4 is returned again.

If the accelerator pedal 4 is returned so that the answer of step S19 is YES, the routine is returned. By contrast, if the accelerator pedal 4 is not returned so that the answer of step S19 is NO, the routine progresses to step S20 to switch a flag Fsh representing the completion of the speed change operation is turned on. Then, the routine is returned.

Figure 9:
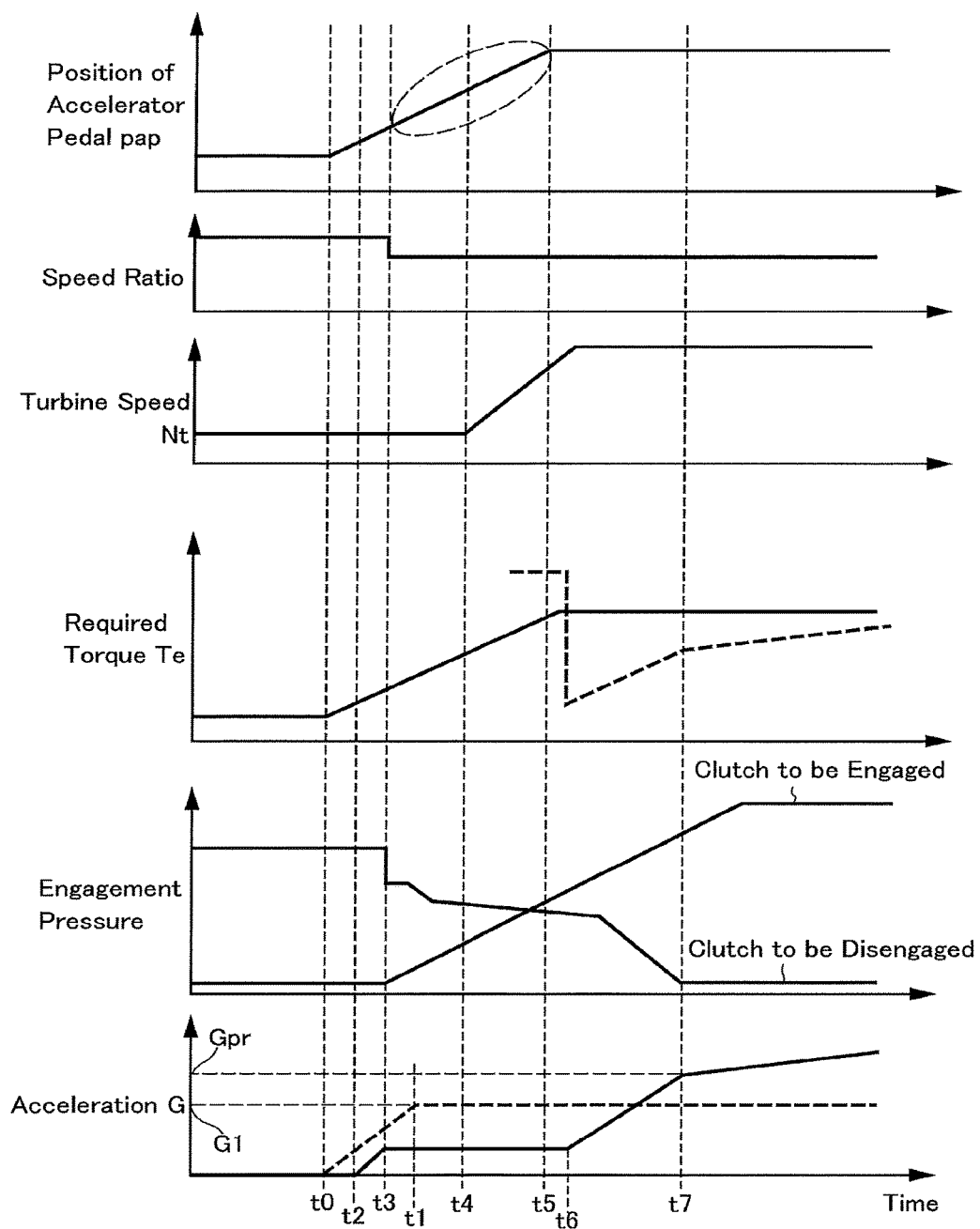
FIG. 9 is a time chart indicating temporal changes in a gear stage, turbine speed, a demanded torque of an engine, an engagement pressure of an engagement device of an automatic transmission, and the acceleration of the vehicle during execution of the control shown in FIGS. 7 and 8.

FIG. 9 indicates temporal changes in the gear stage, turbine speed Nt, a required torque Te of the engine 1, engagement pressure applied to the engagement device of the transmission 7 (i.e., a torque transmitting capacity of the engagement device), and the acceleration G of the vehicle Ve, during execution of the routine shown in FIGS. 7 and 8. In the example shown in FIG. 9, the accelerator pedal 4 is depressed at a predetermined operating speed dpap/dt (constant value) lower than the predetermined speed ß, and then maintained at a predetermined position.

When the accelerator pedal 4 is depressed at point t0, the routine progresses from steps S1 to S3 sequentially, and the acceleration theoretical value Gca based is calculated on the actual operating speed dpap/dtreal of the accelerator pedal 4. In the section showing the acceleration G, a dashed line indicates a change in the theoretical value Gca of the acceleration G, and the theoretical value Gca of the acceleration G plateaus at point t1. In the example shown in FIG. 9, the engine 1 generates the maximum torque in the current gear stage. Then, the target jerk Jtgt to improve the acceleration feeling in the first range is calculated on the basis of the operating speed dpap/dt of the accelerator pedal 4, and the demanded torque Te of the engine 1 gradually increases from the point t0 to achieve the target jerk Jtgt.

The actual torque of the engine 1 increases with a delay behind the increase in the demanded torque Te of the engine 1 so that the acceleration G starts increasing from point t2. In this situation, specifically, the acceleration G is increased at a rate corresponding to the target jerk Jtgt. When the actual acceleration Greal increases to the predetermined percentage ε of the first plateau magnitude G1, the speed change operation is started at point t3. Specifically, the engagement pressure applied to the engagement device engaged to establish the current gear stage is lowered to be disengaged, and the engagement pressure applied to the engagement device to be engaged to establish the target gear stage is increased. In this situation, for example, the transmission 7 may be controlled by the conventionally known clutch-to-clutch shifting method.

The operating speed dpap/dt of the accelerator pedal 4 after point t3 is stored in the ECU 12. Specifically, the operating speed dpap/dt of the accelerator pedal 4 during a period in which the acceleration G plateaus (corresponding to the second plateau period) is stored in the ECU 12. In FIG. 9, the operating speed dpap/dt of the accelerator pedal 4 thus stored is enclosed by the dashed circle.

In the example shown in FIG. 9, the interim target acceleration Gpr is achieved by a single speed change operation, therefore, the answer of step S9 is whereby continuing the speed change operation currently in execution.

Then, at point t4, the inertia phase commences, and the turbine speed starts increasing. In the example shown in FIG. 9, the accelerating operation is completed at a point t5.

Then, the engagement pressure applied to the engagement clutch increases to a predetermined pressure so that the engine torque is transmitted to the driving wheels. As a result, the acceleration G starts increasing again at a point t6. The increasing rate (target jerk Jtgt) of the acceleration U in this process is obtained based on the operating speed dpap/dt of the accelerator pedal 4 stored in the ECU 12 and with reference to the second driving force map. That is, the operating speed dpap/dt of the accelerator pedal 4 during the second plateau period T2 is used to determine the driving force after the acceleration G starts increasing, and the engine torque is controlled in such a manner as to achieve the target jerk Jtgt thus obtained. Specifically, the demanded torque of the engine 1 is set based on the position of the accelerator pedal pap and the vehicle speed V, and the torque of the engine 1 is restricted to a value based on the target jerk Jtgt. In the section representing the demanded torque Te of the engine 1, the dashed line indicates such a restriction value of the torque of the engine 1. Technically, the torque of the engine 1 is controlled on the basis of the target jerk Jtgt.

Then, when the acceleration G exceeds the interim target acceleration Gpr at point t7, the increasing rate of the torque of the engine 1 is reduced to reduce a shock expected to be caused at a point when the acceleration reaches the magnitude based on the position of the accelerator pedal pap.

As described above, given that the operating speed dpap/dt of the accelerator pedal 4 is relatively slow, the driver can sense the intended acceleration with an increase in the jerk J of the vehicle Ve according to the operating speed dpap/dt of the accelerator pedal 4. Therefore, the driving force intended by the driver can be generated to improve the acceleration feeling by calculating the target jerk Jtgt on the basis of the operating speed dpap/dt of the accelerator pedal 4, and by controlling the driving force of the drive unit (mainly the output torque of the engine 1) on the basis of the target jerk Jtgt.

In addition, the speed change operation may be started before the operation status (aspiration manner) of the engine 1 is changed by calculating the first plateau magnitude G1 in advance on the basis of the actual operating speed dpap/dtreal of the accelerator pedal 4, and by starting the speed change operation starts when the actual acceleration Greal reaches the predetermined percentage ε of the first plateau magnitude G1. As a result, the plateau period due to the response delay of the torque of the engine 1 can be shortened thereby reducing the second plateau period T2. For this reason, acceleration feeling in the second range can be improved.

Further, the shock expected to be caused when the actual acceleration Greal is increased to the magnitude based on the position of the accelerator pedal pap may be reduced by reducing the increasing rate of the engine torque when the actual acceleration Greal exceeds the interim target acceleration Gpr. Even if the above-mentioned shock is reduced by the above-mentioned procedure, the actual acceleration Greal is still maintained greater than the interim target acceleration Gpr and hence the driver is still allowed to satisfactory feel the acceleration.

Although the above exemplary embodiments of the present application have been described, it will be understood by those skilled in the art that the present application should not be limited to the described exemplary embodiments, and various changes and modifications can be made within the spirit and scope of the present disclosure.

What is claimed is:

1. A driving force control system for a vehicle, comprising:
    a drive unit including a prime mover and an automatic transmission in which a speed ratio is changeable;
    an accelerator device operated by a driver; and
    a controller that controls a torque generated by the prime mover,
    wherein the controller is configured to:
    calculate an operating amount of the accelerator device;
    calculate an operating speed of the accelerator device;
    calculate a target jerk of the vehicle based on the operating speed of the accelerator device; and
    control an output torque of the drive unit on the basis of the target jerk, when the operating amount is equal to or smaller than a predetermined amount, and the operating speed is equal to or slower than a predetermined speed.

2. The driving force control system for the vehicle according to claim 1, wherein the controller is further configured to:
    calculate an acceleration at which a change in an acceleration of the vehicle plateaus when the torque of the prime mover is increased while maintaining a gear stage of the automatic transmission; and
    shift the gear stage of the automatic transmission to a gear stage of higher speed ratio before an actual acceleration of the vehicle reaches the acceleration at which a change in the acceleration plateaus.

3. The driving force control system for the vehicle according to claim 2, wherein the controller is further configured to calculate the acceleration at which a change in the acceleration plateaus on the basis of the operating speed of the accelerator device.

4. The driving force control system for the vehicle according to claim 2, wherein
    the prime mover includes an engine having a supercharger that supplies pressurized air,
    the controller is further configured to operate the supercharger when a torque demanded to the engine is equal to or greater than a predetermined torque, and
    the acceleration at which a change in the acceleration plateaus includes an acceleration at which the torque demanded to the engine reaches a torque at which the supercharger is operated.

5. The driving force control system for the vehicle according to claim 1, wherein the controller is further configured to reduce an increasing rate of a driving force of the drive unit when the acceleration of the vehicle is equal to or greater than a predetermined acceleration.

6. The driving force control system for the vehicle according to claim 5, wherein the predetermined acceleration includes an acceleration that allows the driver to feel the acceleration satisfactory.

7. The driving force control system for the vehicle according to claim 1, wherein the controller comprises a map to calculate the target jerk on the basis of:
    a time in which the acceleration of the vehicle is kept constant;
    a difference in the acceleration of the vehicle from a point at which an operation of the accelerator device has been started;
    the operating speed of the accelerator device; and
    the vehicle speed.

* * * * *